Patented Oct. 7, 1952

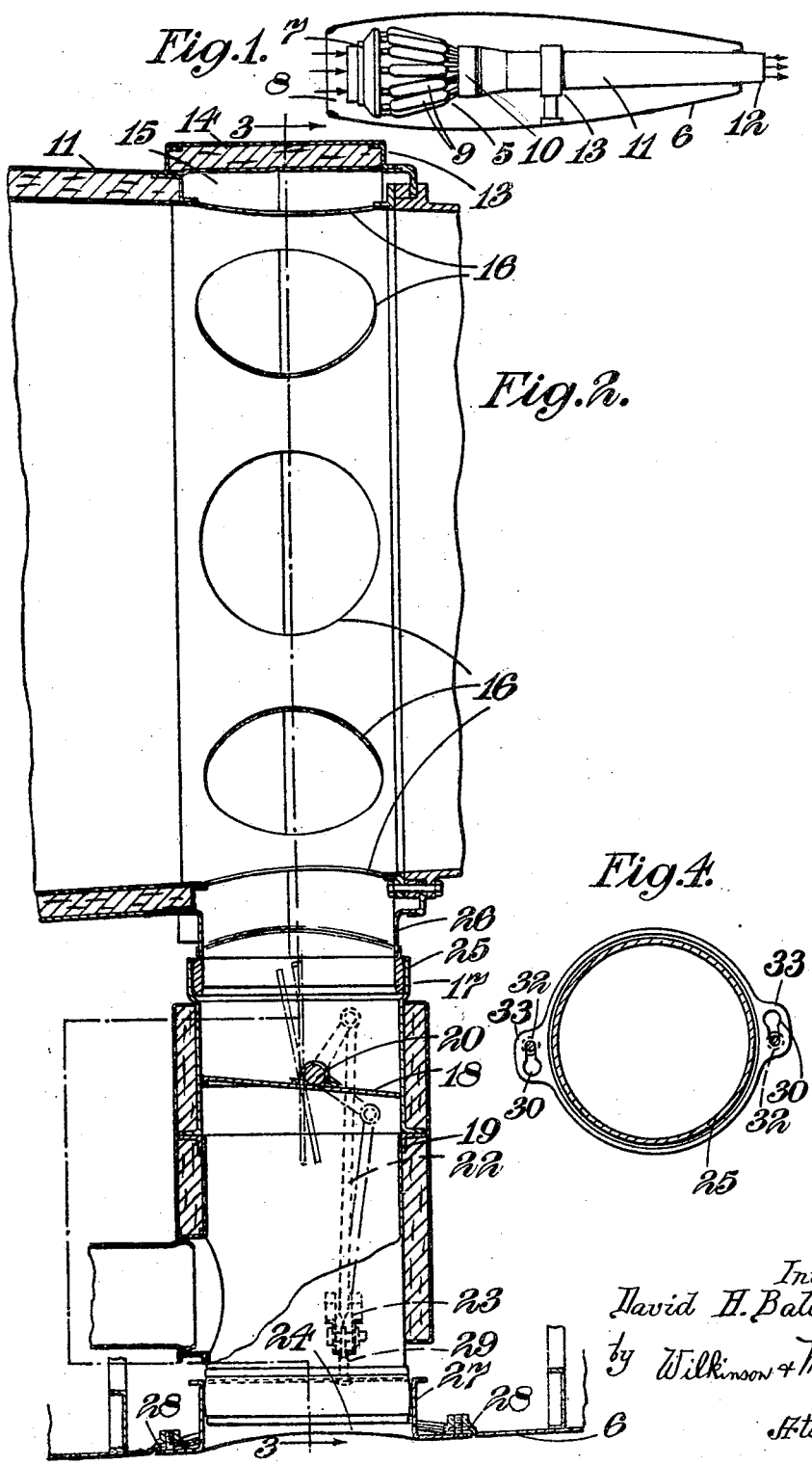

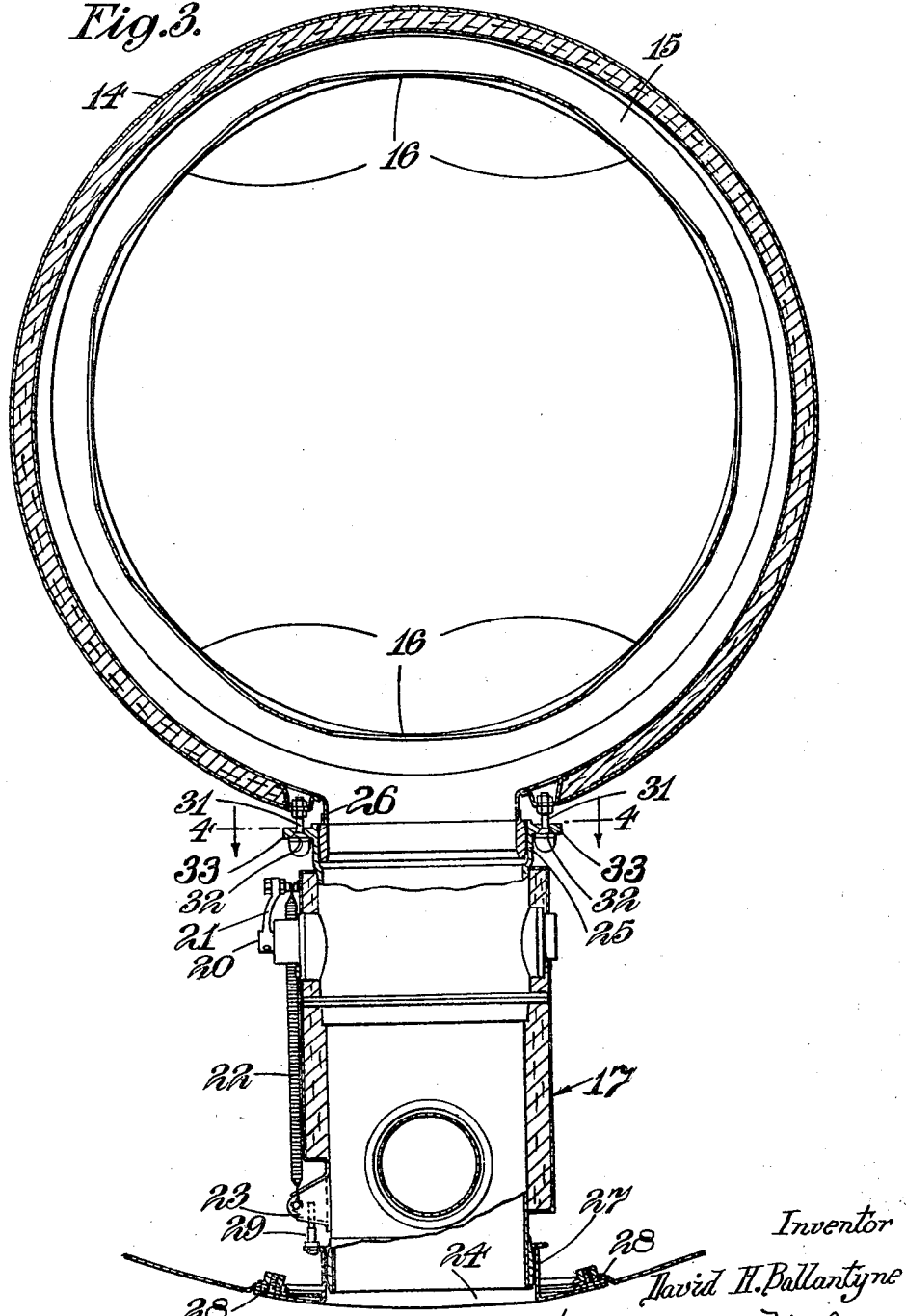

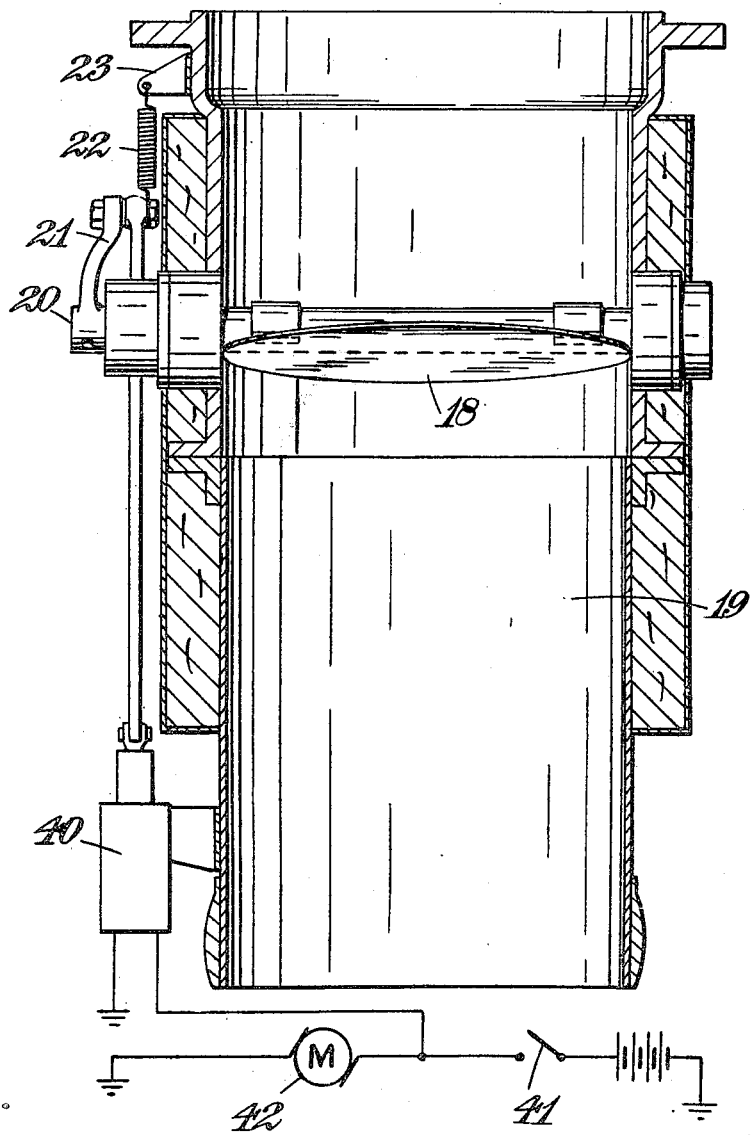

2,612,751

UNITED STATES PATENT OFFICE 2,612,751

CONTROL MEANS FOR GAS-TURBINE OR JET ENGINES WHICH FACILITATES STARTING OF THE ENGINE

David Havelock Ballantyne, York, near Langho, near Blackburn, England, assignor to Rolls-Royce Limited, Derby, England, a British company Application January 20, 1947, Serial No. 723,140
In Great Britain December 27, 1945

Section 1, Public Law 690, August 8, 1946
Patent expires December 27, 1965

11 Claims. (Cl. 60—35.6)

This invention relates to gas-turbines or jet-engines which incorporate a gas-turbine for driving the compressor.

During the starting cycle of a gas-turbine, a starting motor is normally used which will take the engine up to a certain cranking speed which, however, is normally not very high, as the power usually available is, compared with the output of the turbine, very small. It follows therefore that the turbine must be self-sustaining, i. e., be able to run under its own power, at the speed at which it can be driven by the starter motor. The combustion cycle and compressor characteristic of a gas-turbine are, however, such that, at these low speeds, the turbine is extremely sensitive to small changes in either fuel- or air-flow conditions and it is necessary to continue the starting cycle by accelerating the engine to a speed at which stable combustion can be obtained. The main trouble associated with the starting of a gas-turbine engine arises from disproportionate changes of air- and fuel-flow conditions with the result that high temperatures are obtained which are detrimental to the engine.

It has been found that one of the important factors necessitating a high degree of control of the amount of fuel required during the starting cycle, is associated with the volume of the exhaust-pipe or jet-pipe being used, wherein a stationary column of air has to be accelerated by a gas-stream which is at a high temperature but at very low pressure. This difficulty is intensified as the length, and therefore the volume, of the jet-pipe is increased. The difficulty of starting is occasioned by a build-up of resonance in the exhaust- or jet-pipe, which resonance appears to be a function of the length of the pipe. In general, the difficulty is found not to occur when the pipe is short, but resonance arises as the length of the pipe is increased and such resonance results in violent instability of combustion accompanied by a reduction of the air-flow through the blower, and consequent irregularity.

The object of this invention is to provide an improved construction whereby the starting of such engines is facilitated, and it is applied to installations having an exhaust- or jet-pipe which is long compared to its transverse dimensions and is of such a length that the difficulty of resonance is encountered, such pipes being hereinafter described as "of considerable length."

In this specification the phrase "starting of a gas turbine or jet propulsion engine" means the running up of the engine from rest by an external power source, which running up is accompanied by ignition of fuel in the combustion equipment of the engine such that when the external power source is disconnected, the engine is running under its own power at idling speed or is capable of accelerating under its own power to such speed.

A practical application of the present invention will now be described, by way of example, with reference to the accompanying drawings whereof, Figure 1 is a diagrammatic side elevation of a jet-propulsion engine in accordance with the present invention.

Figure 2 is a sectional elevation of a part of the jet-pipe of the engine of Figure 1, the view being to an enlarged scale, Figure 3 is a section on the line 3—3 of Figure 2, Figure 4 is a section on the line 4—4 of Figure 3, and Figure 5 is a section of another embodiment of the invention.

The jet engine of Figure 1 is generally indicated by the reference numeral 5 and is housed within a nacelle 6 of streamlined formation, the nacelle forming a part of an aeroplane (not shown). The engine 5 comprises a compressor 7 having a forwardly facing opening to receive air through the mouth 8 in the nacelle 6. The air from compressor 7 passes in sequence through the combustion chambers 9, the turbine 10 and the jet-pipe 11. Gases from the engine 5 are discharged at the rear end 12 of the pipe 11 to propel the aircraft by jet reaction.

Towards the inlet end of the pipe 11 there is provided means (generally indicated by the reference numeral 13) for preventing the building-up of back-pressure or resonance in the pipe 11 when starting the engine 5.

Referring now to Figure 2:

The means 13 comprises a casing 14 which envelopes the jet-pipe 11 and defines therebetween a collecting chamber 15. That portion of the pipe 11 which lies below the casing 14 is provided with a series of openings 16 so that the inside of the pipe 11 is placed in communication with the chamber 15.

Associated with the casing 14 is a valve unit generally indicated at 17, such a unit comprising the valve proper at 18 and a trunk 19 which carries the valve and communicates at one end with the chamber 15 and at the other end with atmosphere through the nacelle 6.

The valve 18 is of the butterfly type and is mounted so as to be unbalanced, the arrangement being that it tends automatically to close when the pressure within the collecting chamber 15 rises. The valve 18 is carried upon a spindle 20 having attached to it a lever 21 to which one end of the spring 22 is secured. The spring 22 is anchored to the trunk 19 by means of a bracket 23. The spring is provided to hold the valve 18 in its open position, the rating of this spring being determined by the pressure at which it is desired the valve should be closed.

It will be appreciated from the above description that the gases travelling along the pipe 11 will pass through the holes 16 into the collecting chamber 15 and thence through trunk 19 to be discharged through the nacelle 6 by means of outlet 24. As a consequence the valve 18 will be subjected to the pressure of these gases and its opening and closing will be determined thereby. Assuming that the valve is open, as the pressure within the jet-pipe 11 rises the valve will be closed. Similarly when the valve is closed as the pressure within the jet-pipe falls, the valve will automatically be opened by the spring 22.

With this arrangement of automatic valve no additional cockpit control is required, but any other arrangement for controlling the valve may be used. It may, for example, be arranged as illustrated in Figure 5 to be opened and closed by an electrical control solenoid 40 which is operated by the switch 41 of the starter mechanism for the engine 5, which, in this embodiment, is the electric motor 42.

The trunk 19, valve 18, spring 22 and bracket 23 together constitute the unitary structure 17 which may be attached to, and removed from, the casing 14 as a whole.

The trunk 19 is, at its upper end, formed with a flared skirt 25 which is adapted to surround the lower extremity of the pipe 26 which is attached to the casing 14 and is in communication with the collecting chamber 15. The lower edge of the pipe 26 is formed with a spherical surface and this surface engages with the inside of the skirt 25. This spherical joint will permit slight relative movement between the pipe 26 and the trunk 19 as is required to accommodate expansion. A similar spherical joint is provided for the lower end of the trunk 19. In this case the trunk is formed with a spherical seating to engage with an upwardly extending flange 27 secured to the nacelle 6 as at 28. The flange 27 is removable from the nacelle by the means 28 and, when so removed, permits the valve unit 17 to be passed through the nacelle and attached to the casing 14.

The spherical joints, whilst they accommodate for expansion, do not prevent the trunk 19 from rotating about its long axis and to this end there is provided a projection 29 which is carried by the flange 27 and is adapted when the latter is attached to the nacelle 6 to engage the bracket 23. The projection 29 is shown in its engaged position in Figure 3 and it will be appreciated that it prevents rotation of the trunk 19.

The skirt 25 of the trunk 19 is formed at diametrically opposed points with lugs 33 having key-hole slots 30 (Figure 4) and the casing 14 has two depending spherically headed bolts 31. The heads of the bolts are adapted to pass through the key-hole slots 30 and when the latter are rotated to engage recesses 32 in the lugs 33 and thus hold the valve unit 17 suspended from the casing 14. The spherical faces of the bolt assembly permit the necessary freedom of the system to accommodate expansion and similar small movements.

I claim:

1. In combination, a gas turbine engine, an exhaust pipe of considerable length for said engine, an exhaust outlet for said exhaust pipe, a second outlet for said exhaust pipe additional to said exhaust outlet, and valve means for said second outlet biassed to an open position and arranged to be closed by pressure developed in said exhaust pipe.

2. A combination according to claim 1 wherein said valve means is of the butterfly type, is spring urged to said open position and is arranged in said open position partially to choke said second outlet.

3. In combination, a gas-turbine engine, an exhaust pipe of considerable length for said engine, an exhaust outlet for said exhaust pipe, a collecting chamber, at least one lateral opening in said exhaust pipe connected to said collecting chamber, an outlet from said collecting chamber and valve means for said collecting chamber outlet biased to an open position and arranged to be closed automatically by pressure developed in said exhaust pipe.

4. A combination according to claim 1 wherein said second outlet and said valve means constitute a unitary structure which is attachable to and detachable from said exhaust pipe.

5. A combination according to claim 4 wherein said unitary structure is attached to said exhaust pipe by a mounting which permits relative movements of expansion therebetween.

6. A combination according to claim 1 wherein said second outlet is provided near the inlet end of the exhaust pipe.

7. In combination a gas-turbine engine, an exhaust pipe of considerable length for said engine, an exit outlet for said exhaust pipe, a collecting chamber surrounding said exhaust pipe near the inlet end thereof, apertures in the wall of said exhaust pipe connecting the interior thereof to said collecting chamber, an outlet from said collecting chamber, a trunk communicating with said outlet from said collecting chamber, a butterfly valve in said trunk arranged to close said trunk in its closed position, an abutment mounted on said butterfly valve, a fixed abutment, a spring connected at one of its ends to said abutment mounted on said butterfly valve and at its other end to said fixed abutment and arranged to urge said valve into an open position wherein said valve partially chokes said trunk.

8. In combination, a gas turbine engine, a starter mechanism for said engine, means to control said starter mechanism, an exhaust pipe of considerable length for said engine, an exhaust outlet for said exhaust pipe, a second outlet for said exhaust pipe additional to said exhaust outlet, valve means for said second outlet, and valve control means actuated by said means to control said starter mechanism to open said valve when said mechanism is controlled to start the engine.

9. A combination according to claim 8 wherein said starter mechanism and said valve control means are electrically operated.

10. In combination, a gas-turbine engine, a starter mechanism for starting said engine, an exhaust pipe of considerable length for said engine, an exhaust outlet for said exhaust pipe, a second outlet for said exhaust pipe additional to said exhaust outlet, a valve for said second outlet, a control to open and close said valve, and means to operate said control and said starter mechanism in conjunction to open said valve and to energize said starter mechanism; whereby said valve is opened when said starting mechanism initiates the starting of said engine and remains open while said starting mechanism continues the starting of said engine, and is closed when said starting mechanism terminates the starting of said engine.

11. A combination according to claim 10, wherein said starting mechanism is an electric motor, and wherein said control is an electrical control.

DAVID HAVELOCK BALLANTYNE.

REFERENCES CITED

The following references are of record in the file of this patent:

UNITED STATES PATENTS

| Number | Name | Date |
|---|---|---|
| 2,123,009 | Johansson | July 5, 1938 |
| 2,280,835 | Lysholm | Apr. 28, 1942 |
| 2,418,488 | Thompson | Apr. 8, 1947 |

FOREIGN PATENTS

| Number | Country | Date |
|---|---|---|
| 437,095 | Great Britain | Oct. 23, 1935 |